Feb. 5, 1957 V. BERWAERTS 2,780,456
METHOD AND APPARATUS FOR AUTOMATICALLY REGULATING
QUANTITIES OF MATERIAL ADDED TO A MIXTURE
Filed July 1, 1954 7 Sheets-Sheet 1

INVENTOR.
VICTOR BERWAERTS
BY

INVENTOR.
VICTOR BERWAERTS

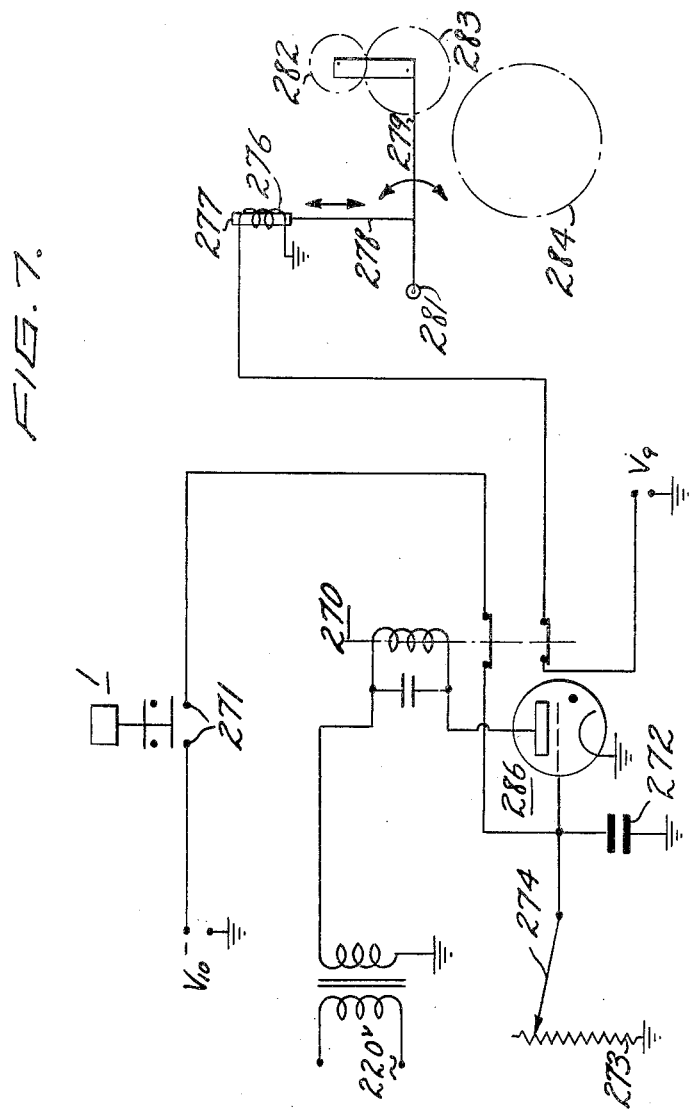

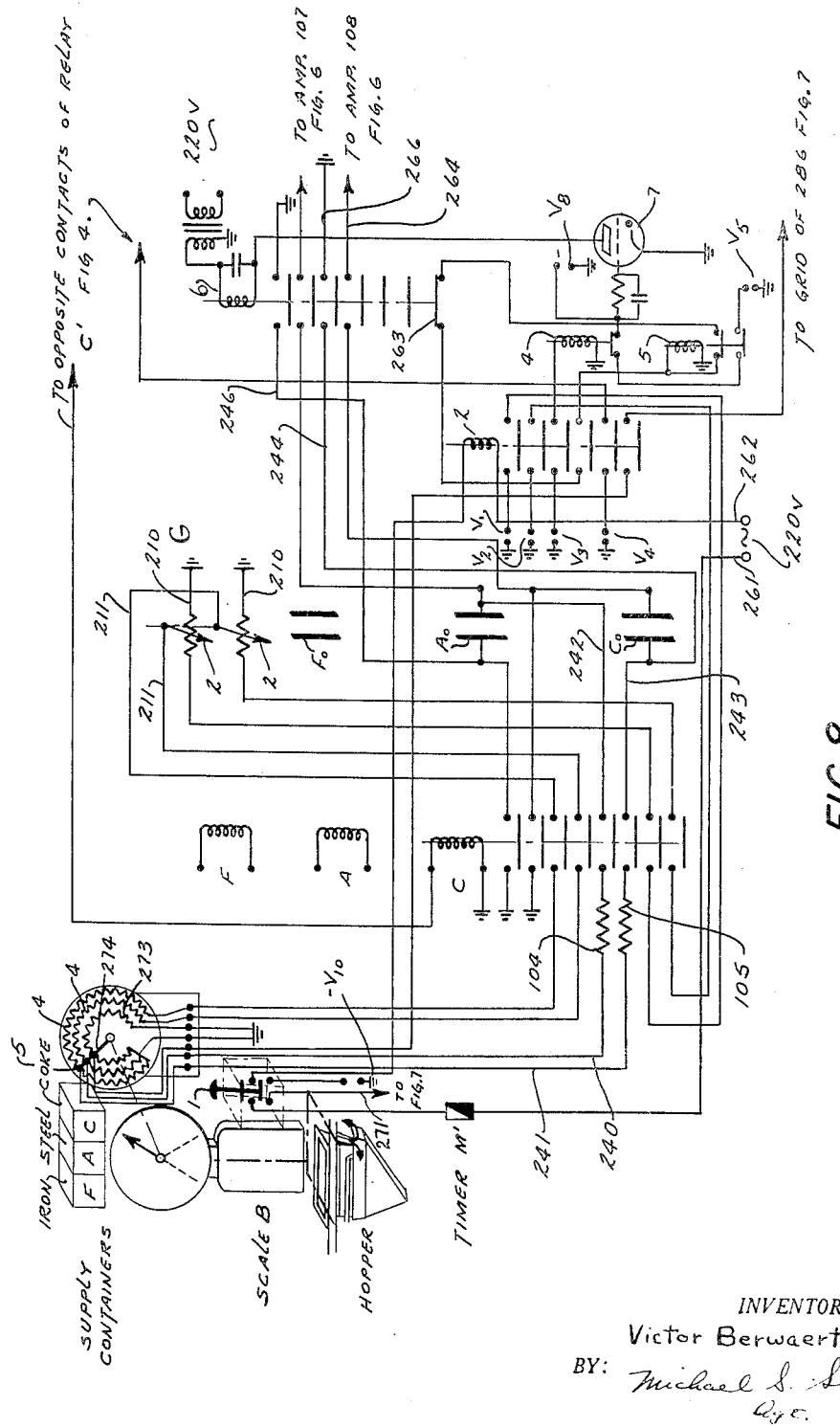

United States Patent Office 2,780,456
Patented Feb. 5, 1957

2,780,456

METHOD AND APPARATUS FOR AUTOMATICALLY REGULATING QUANTITIES OF MATERIAL ADDED TO A MIXTURE

Victor Berwaerts, Gingelom, Belgium

Application July 1, 1954, Serial No. 440,833

Claims priority, application Belgium July 3, 1953

4 Claims. (Cl. 265—29)

The present invention relates to a new and improved method and apparatus for automatically regulating the ratio between a plurality of materials in a mixture.

More particularly, the present invention relates to a new and improved method and apparatus for automatically controlling the loading operations of a cupola in a foundry.

There are many processes now used wherein large quantities of several materials are added to and maintained in a mixture in a predetermined ratio. In order to be sure that the final product has the proper ratio between each of the component parts, the loading of each component part into the mixture is carefully regulated. For example, in the making of certain types of cast iron, component materials such as coke, steel and cast iron are loaded into a cupola. The composition of the cast iron which is obtained from the cupola is, of course, dependent upon the proportions of the component materials that are actually loaded in the cupola.

The conventional practice in foundries is to carefully load controlled quantities of each of the component materials into the cupola so that the final mixture contains these materials in the proper proportion. It is apparent that such a process is time consuming since the quantities and types of material being used require bulky handling facilities. In order to maneuver these handling facilities so that the actual quantities loaded equal the desired theoretical quantities, an operator must use these facilities with utmost caution.

On the other hand, the present invention permits an operator to load rough amounts of material somewhere near the theoretically desired amount. The rough amounts actually loaded are automatically registered and after each addition of a component material into the mixture, apparatus embodying the principles of the present invention automatically indicates what component material should be added in order to maintain the materials in the mixture at the desired predetermined ratio.

Accordingly, it is an object of the present invention to provide a new and improved method and apparatus for automatically maintaining a plurality of materials in a mixture in a predetermined ratio.

Another object of the present invention is to provide a method for controlling the composition of a mixture while permitting inaccurate quantities of the component materials to be added.

A further object of the present invention is to provide a method and apparatus for automatically indicating the proper order in which each of several component materials should be added to a mixture.

With the above objects in view, the present invention mainly consists of a method of making, from a plurality of component materials, a mixture in which the materials are present in a predetermined ratio comprising, in combination, the steps of starting the mixture with the first of the materials at a quantity near the theoretically desired amount, automatically registering the actual quantity of the first material used, adding to the first material an amount of the second material near the theoretically desired amount, automatically registering the actual quantity of the second material added, continuing to add each of the materials at quantities near their theoretical desired values and registering each of the actual quantities used until all of the plurality of materials have been added, converting the values of the actual quantities used to electrical voltage values, multiplying each of the voltage values by voltages representing the desired ratios of each of the other materials to obtain a plurality of products, automatically subtracting each of the products from each of the other products to obtain a plurality of product differences, the largest of the product differences being an indication of which of the actual quantities of materials has the largest negative departure from the theoretically desired value, adding the material having the largest negative departure, and continuing to add material showing the largest negative departure between actual and theoretical quantities to maintain the predetermined ratio between all of the plurality of component materials in the mixture.

The novel features which are considered as characteristic for the invention are set forth in particular in the appended claims. The invention itself, however, both as to its contsruction and its method of operation, together with additional objects and advantages thereof, will be best understood from the following description of specific embodiments when read in connection with the accompanying drawings, in which:

Fig. 7 is a schematic wiring diagram of that portion of the apparatus which indicates the actual amount of component material that has been added; and Fig. 8 is a composite schematic diagram showing the connections between the electrical control members of the present invention and the various operating elements thereof.

Figure 1:
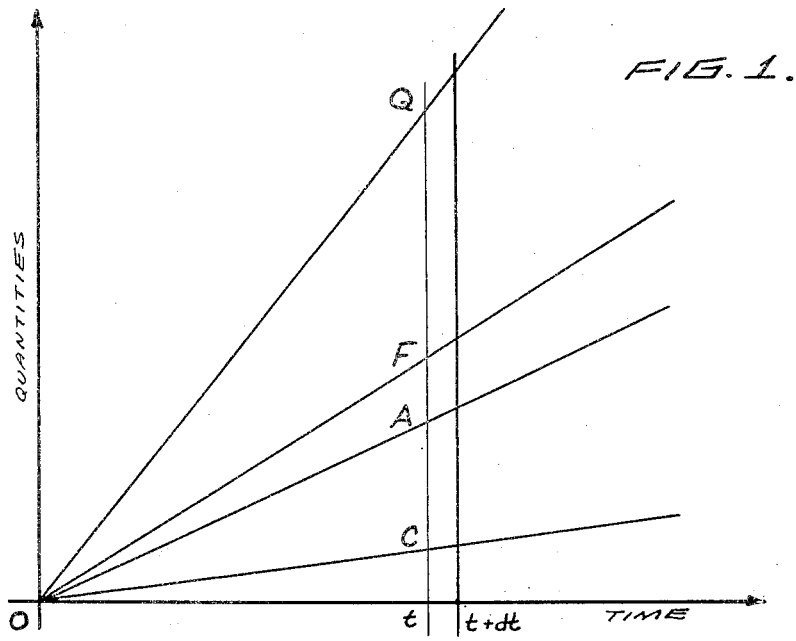
Fig. 1 is a graph showing the variation with time of the quantities of the component materials added to the mixture.

Referring now to the drawings and particularly to Fig. 1 a graph is shown, indicating the variation with time of three component materials that are added to a mixture. If the component materials were added in a continuous manner, it is seen that the quantities would be represented theoretically by straight lines OF, OA and OC. At any time, $t$, those quantities that have been added are equal to the area under the curve $OFt$, $OAt$ and $OCt$.

The total quantity of material added at time $t$ is represented by the area under the curve $OQt$ where Q represents the total of the other three quantities. At the time, $t+dt$, new additions of the basic quantities should be made so as to keep the curves OC, OF, OA and OQ on the extension of the straight lines illustrated. Therefore at any moment theoretically the following relationship should exist:

$$tC+tA+tF=tQ \qquad (1)$$

and $$tC:tA:tF=a:b:c \qquad (2)$$

where $a$, $b$, $c$ represent the relative theoretical proportions of the components.

From a practical standpoint, it is very difficult to add bulky material to a mixture in a continuous manner. Accordingly, in accordance with the present invention several approximate additions of the component materials are made without limiting precisely the addition of these component materials with respect to time or quantity. Therefore at a particular time, $t$, instead of containing the exact theoretical amounts illustrated by the points F, A, C and Q the actual points will be either above or below these theoretically desired quantities. The purposes of this invention are carried out by automatically determining the departure of the actual quantity of component material added from the theoretically desired quantity.

As an example, take foundry operation where cast iron is being produced. It is known that the composition of the cast iron recovered at the outlet of a cupola depends among other things on the solid loads introduced. That is, at least three component materials are added with the requirement that a predetermined ratio be maintained therebetween. These materials are cast iron, steel and coke. For simplicity, the materials will be indicated respectively as F, A, and C. At periods of time, spaced as regularly as possible the cupola has to be loaded with a certain quantity of material in predetermined proportions F:A:C. At the present time the conventional method of loading the cupola is to successively add a certain quantity of F, then A, then C for time intervals as near as possible to the theoretically desired value. It is apparent that this method takes considerable time since any error in the actual quantity loaded is not discoverable until after the cast iron has been released from the cupola.

If $f$, $a$ and $c$ designate the respective theoretical percentages of cast iron, steel, and coke composing a load Q; and F, A and C are the sums of the quantities of those materials which have actually been loaded during a time $t$, the following relationships can be set up:

$$ac\epsilon F - fc\epsilon A = X$$
$$fc\epsilon A - fa\epsilon C = Y$$
$$af\epsilon C - ac\epsilon F = Z \quad (3)$$

Analysis of these equations will indicate that the algebraic values of X, Y, and Z represent at any moment the differences for cast iron (X), steel (Y) and coke (Z) between the quantities actually loaded and those which theoretically should have been loaded. It should be noted that the materials are taken two at a time. For example if not enough cast iron has been loaded while the proper amounts of steel and coke have been loaded, Equations 3 will indicate:

$X=$ a negative quantity
$Y=0$
$Z=$ a positive quantity

The above assumes that the quantity of steel is larger than the quantity of cast iron. Therefore, from these results it is apparent that cast iron should be loaded as indicated by the negative value X. Similarly negative values of Y and Z can be shown to relate to steel and coke, respectively.

If loading errors are made on all three materials, it can be established that that value of X, Y or Z which shows the largest difference between the actual quantity and the desired theoretical quantity in the negative direction should be loaded.

Accordingly, these quantities can be converted into voltages which set up the theoretical percentages shown in Equations 3. That is, a continuous voltage E can be subdivided into three parts:

$ac$E for cast iron
$fc$E for steel
$af$E for coke

If the above values are multiplied by voltages corresponding respectively to the actual quantities loaded, products are obtained which represent each of the quantities illustrated in Equations 3. Now, if these products are subtracted one from the other in the manner indicated by Equations 3 the resulting voltages will be equal to the quantities X, Y and Z. The largest of these quantities in the negative direction then obviously automatically determines which of the three component materials cast iron, steel or coke should be loaded.

The above described method is carried out by apparatus embodying the principles of the present invention.

Figure 2:
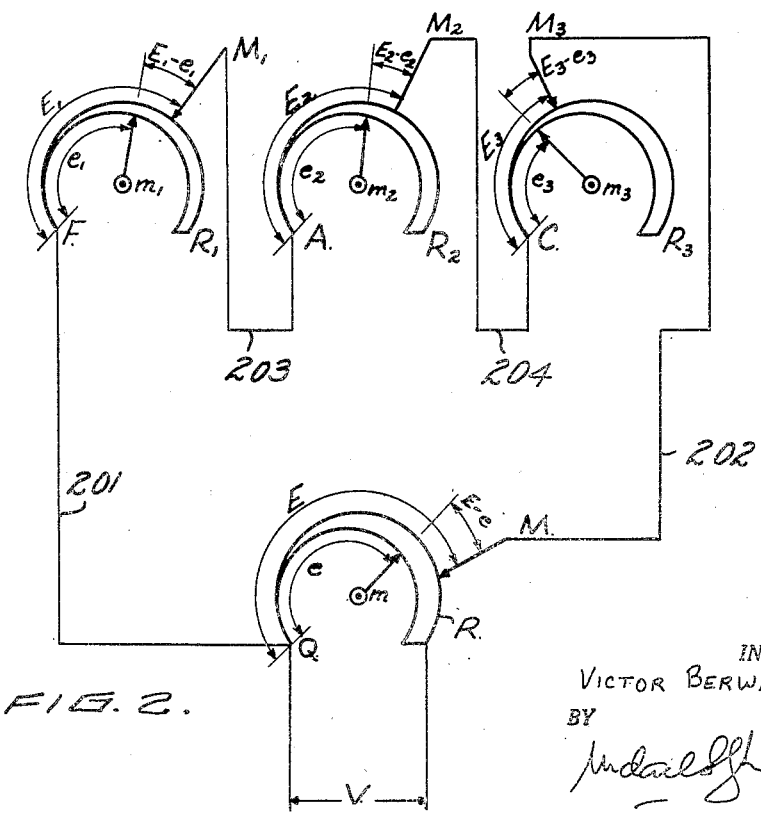
Fig. 2 is an electrical, schematic diagram showing the interconnection of four potentiometers used with apparatus embodying the principles of the present invention.

Referring to Fig. 2, a voltage V is applied across a potentiometer R. Three variable rheostats $R_1$, $R_2$, and $R_3$ are connected in series across the output of potentiometer R taken on conductors 201 and 202. Conductor 201 is connected to the F rheostat $R_1$. From the movable arm $M_1$ of rheostat $R_1$ a conductor 203 is connected to the A rheostat $R_2$. Similarly, conductor 204 connects movable arm $M_2$ to the C rheostat $R_3$. $M_3$, the movable arm of rheostat $R_3$, is connected on conductor 202 to the movable arm of rheostat R.

Movable arms M, $M_1$, $M_2$, and $M_3$ are set at the start of operation so that the resistance of each of the rheostats reflects a value proportional to the amount of material to be loaded. That is, a voltage E is available from potentiometer R; a voltage $E_1$ is available from rheostat $R_1$; a voltage $E_2$ is available from rheostat $R_2$; and a voltage $E_3$ is available from rheostat $R_3$. It is apparent from Fig. 2 that:

$$E = E_1 + E_2 + E_3$$

This represents voltages which are proportional to the equation:

$$Q = F + A + C$$

Rheostats $R_1$, $R_2$ and $R_3$ are also provided with movable arms $m_1$, $m_2$ and $m_3$, respectively. These arms are mechanically connected with a scale for measuring the actual loading of the component materials. Therefore, when cast iron is loaded, the arm $m_1$ is displaced an amount proportional to the actual quantity of cast iron loaded. This arm provides a voltage $e_1$ which is proportional to the actual quantity of cast iron loaded. Similarly, voltages $e_2$ and $e_3$ are obtained which are proportional to the actual quantities of steel and coke loaded. Arms $m_1$, $m_2$ and $m_3$ are interconnected with an arm $m$ on potentiometer R. Therefore this arm provides a voltage $e$ equal to the sum of voltages representing the total quantities of actual materials loaded.

Therefore, from the arrangement of Fig. 2, there is available voltages representing the theoretical quantities of the materials to be loaded; voltages representing the actual quantities of materials loaded; and voltages representing the totals of each of these quantities.

Figure 3:
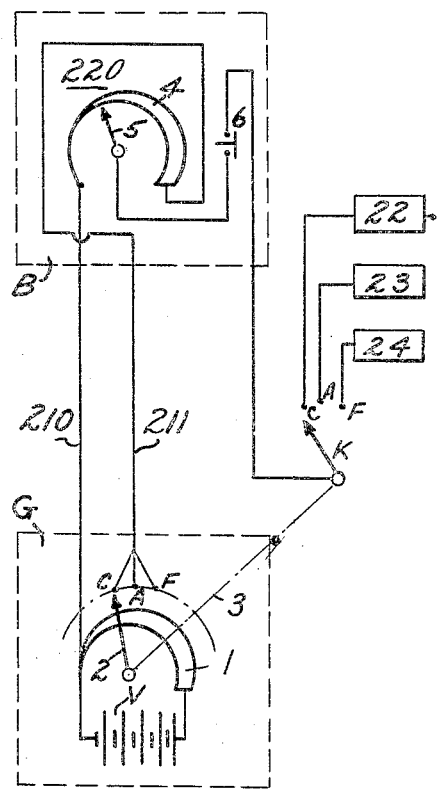
Fig. 3 is a block diagram showing the interrelation between the various electronic components of one embodiment of the apparatus.

Referring now to Fig. 3, the method of converting the mechanical quantities to be loaded into electrical quantities which can be used for Equations 3 will be shown. A switch is indicated by the dotted line G. The switch G includes a battery V, a resistance 1, a variable arm 2 which slides on resistance 1 and at least three contacts C, A and F. Switch G includes a second arm K mechanically coupled to arm 2 on axis 3.

Switch G is connected on conductors 210 and 211 to a mechanism in a scale indicated by the dotted line B. The scale B is used with the hopper into which the materials are loaded before going into the cupola. The scale B includes a potentiometer 220 having a resistance 4 and a movable arm 5. The voltage appearing on conductors 210 and 211 is applied across the potentiometer resistor 4. Since the theoretical percentages $c$, $a$ and $f$ representing the ratio between the materials to be loaded into the mixture are known it is a simple matter to set up the three points on switch G, C, A and F which represent respectively $ac$E, $fc$E, and $af$E where E is the voltage applied across resistance 1 of switch G. It will be noted that these are the quantities appearing in Equations 3.

A movable arm 5 of potentiometer 220 is directly connected to the weighing portion of the scale B. Therefore, this arm assumes a position which is dependent upon the actual quantity loaded. It is apparent therefore that the voltage appearing on this arm is equal to the applied voltage multiplied by a voltage proportional to the material being loaded. That is, a voltage $acE \times F$ is obtained when iron is loaded; a voltage $fcE \times A$ is obtained when steel is loaded; and a voltage $afE \times C$ is obtained when coke is loaded.

Accordingly, there only remains the necessity for combining these quantities into the proper relationship indicated by the Equations 3. This is accomplished by the remaining circuits shown in block diagram in Fig. 3. That is, when switch 6 of scale B is closed, the voltage appearing on the movable arm 5 is applied to either circuit 22, 23 or 24 shown in block diagram in Fig. 3, depending on which material has just been loaded.

Figure 4:
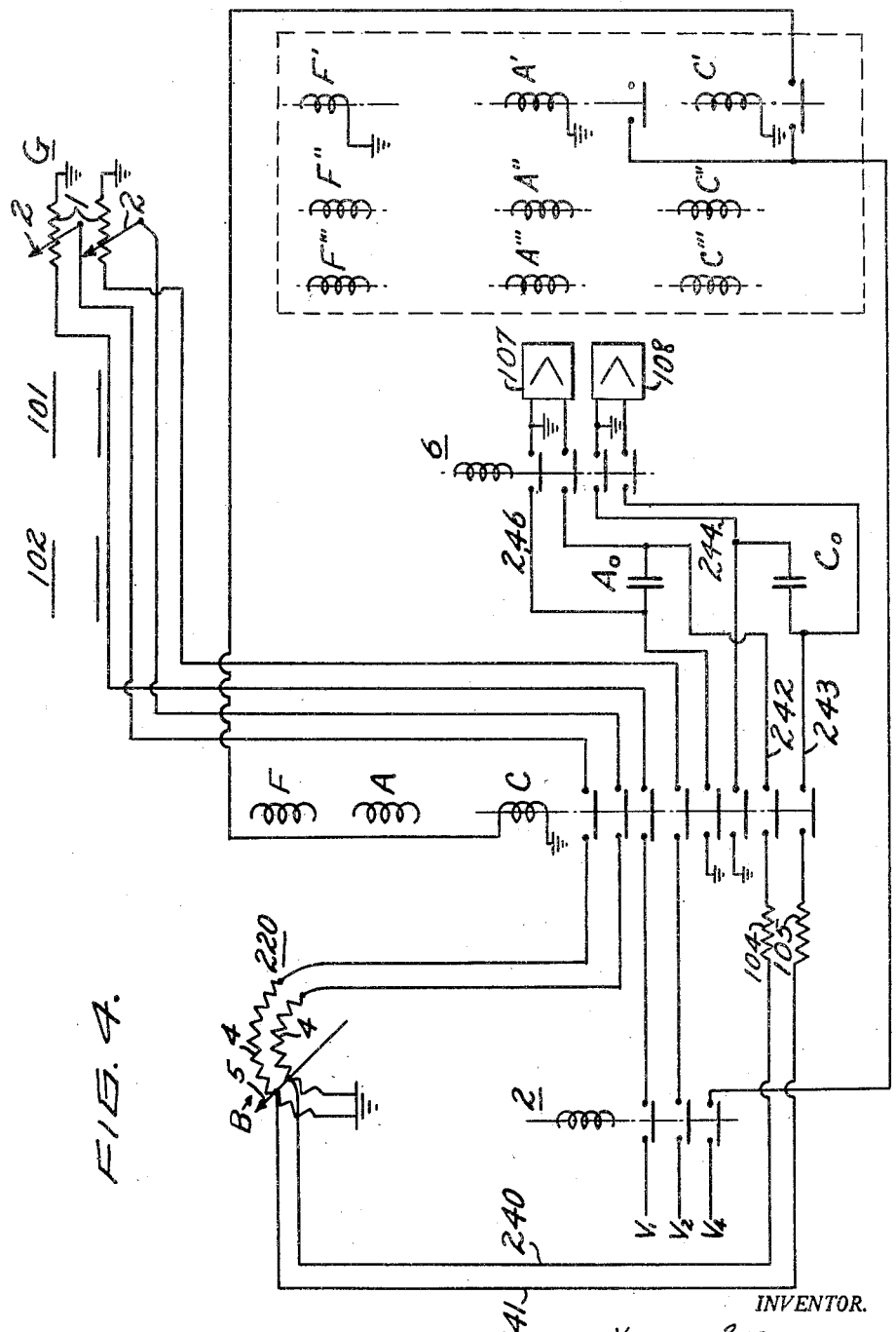
Fig. 4 is an electrical schematic diagram of that part of the apparatus which converts the actual quantity of component material loaded into an equivalent electrical voltage.

Referring now to Figs. 4 and 8, the circuit illustrated by the block diagram 22 is shown in detail. This circuit is connected for the loading of coke but it should be realized that circuits 23 and 24 are similar except for some of the actual values used. In this circuit the switch G is seen to contain a pair of duplicate resistances 1 on which duplicate movable arms 2 travel. Similarly, on switch 220 of scale B duplicate resistances 4 are provided on which duplicate movable arms 5 travel.

When the coke is loaded into the hopper of the scale B the movable arm 5 is deflected an amount proportional to the actual weight of the coke. Therefore, the voltages available on conductors 240 and 241 are equal to $afE \times C$. Everything in Fig. 4 so far has been shown in duplicate because it will be noted that this quantity $afE \times C$ appears twice in the Equations 3. These voltages are applied respectively to resistors 104 and 105. The other side of resistors 104 and 105 are connected to normally open contacts of a relay C.

The mating contacts of relay C are connected on conductors 242 and 243 to condensers $A_0$ and $C_0$ respectively. It should be noted that these conductors are connected to opposite sides of the condensers so that these condensers are charged through resistors 104 and 105 respectively in opposite directions. The condensers $C_0$ and $A_0$ are also connected to normally open contacts of a relay 6 by means of conductors 244 and 246, respectively. The mating contacts of relay 6 are connected to electronic circuits 107 and 108, respectively. Therefore, upon energization of the relay C condensers $A_0$ and $C_0$ are charged in opposite directions to a voltage proportional to $afE \times C$.

When the steel is loaded in the hopper, a second double potentiometer 101 is used and preset to supply the voltage $fcE$. The pointer 5 on the variable rheostat 220 now assumes a position dependent upon the actual quantity of the steel in the hopper. The output of rheostat 220 now goes through the contacts of the A relay to mate with condensers $A_0$ and $F_0$ (not shown). The result will be that condenser $A_0$ has a voltage proportional to the difference $A - C$. The $F_0$ condenser will be charged to a voltage proportional to the actual value A.

Upon the third loading, namely cast iron, the double potentiometer 102 is utilized. The output of the variable rheostat 220 now passes through relay F to charge condensers $F_0$ and $C_0$ to a voltage proportional to the actual quantity F of the cast iron loaded.

Accordingly, at the end of the three loading operations, across the terminals of the three condensers $F_0$, $A_0$, and $C_0$ there appears voltages proportional respectively to $F-A$, $A-C$ and $C-F$. Referring to Equations 3 it is seen that these are the quantities $x$, $y$ and $z$, respectively. Relay 6 is now closed to connect condenser $F_0$ to the grid of an amplifier 106; condenser $A_0$ to the grid of an amplifier 107; and condenser $C_0$ to the grid of an amplifier 108. It is to be observed that the relay (6) is closed after each weighting operation and is opened immediately thereafter. The amplifiers are conventional amplifiers which are biased to respond only to negative voltages. That is, negative voltages will cut these amplifiers off thereby raising the voltage appearing at their anodes.

Figure 6:
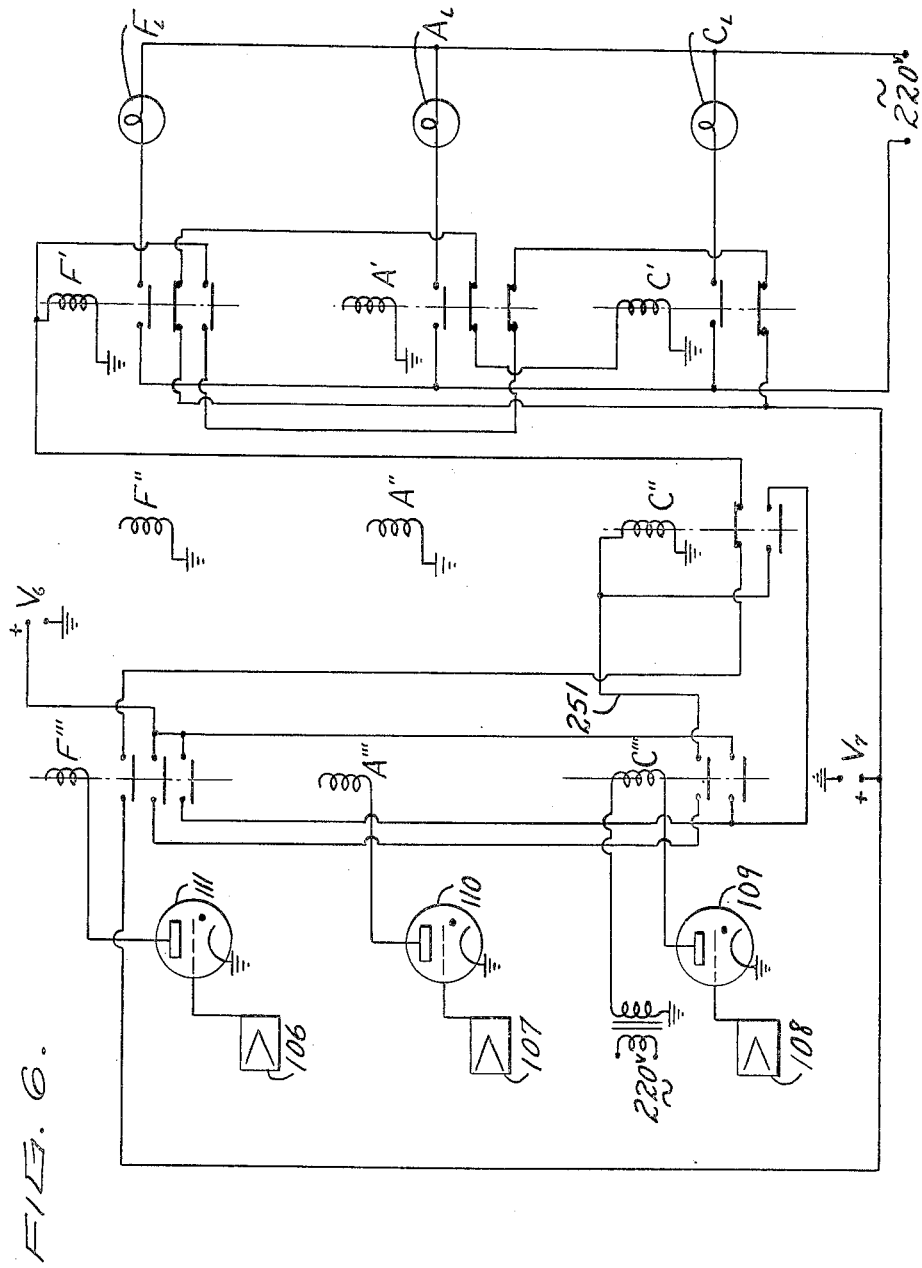
Fig. 6 is an electrical schematic diagram of that portion of the circuit which indicates the next component material to be added.

Referring now to Fig. 6, it can be seen that the output from the anodes of amplifiers 106, 107 and 108 are connected respectively to the grids of non-conducting thyratrons 111, 110 and 109. In the anode circuit of the thyratrons 109, 110 and 111 are connected respectively the coils of relays $C'''$, $A'''$ and $F'''$. The contacts of these relays are connected respectively to relays $C''$, $A''$ and $F''$ which have contacts that in turn are connected to relays $C'$, $A'$ and $F'$.

In addition, the relays $C'$, $A'$ and $F'$ are interconnected so that when one is energized, neither of the other two can be energized. Also, their interconnection require that at least one of them must always be energized. Each of the relays $C'$, $A'$ and $F'$ are associated with respective signal lights $C_L$, $A_L$ and $F_L$. It can be seen that when one of the relays $C'$, $A'$ or $F'$ is closed, its corresponding signal light will have 220 volts applied thereacross.

Therefore, if a negative voltage is applied to the grid of any of the three amplifiers 106, 107 and 108, thereby cutting it off, its anode voltage will rise thereby triggering its associated thyratron. The triggering of the thyratron establishes a conductance path to ground for its associated relay. For example in Fig. 6 the triggering of thyratron 109 will effectively connect one side of the coil of relay $C'''$ to ground thereby applying the illustrated 220 volts across the relay coil. This will close the normally opened contacts of relay $C'''$ thereby applying on conductor 251, the voltage $V_6$ to the coil of the relay $C''$. The energization of relay $C''$ acts to de-energize relay $A'$ or $F'$ depending on which one is energized thereby permitting voltage $V_7$ to energize relay $C'$ through the normally closed contacts of relays $F'$ and $A'$.

The above operations therefore result in the energization of relay $C'$ and illumination of the signal light $C_L$. This indicates to the operator that there is an error in the amount of coke loaded in the negative direction therby by requiring an additional load of coke. It is of course possible that more than one of the quantities will have been loaded with an amount less than the required theoretical amount. Therefore, upon closing of the relay 6 of Fig. 4 more than one voltage applied to the three amplifiers will be negative. However, since the amplifiers are similarly biased, that voltage which is the most negative will operate to cut off its amplifier the quickest thereby discharging its associated thyratron. Accordingly, the combination of relays that will be energized to illuminate the signal lamp for the next loading operation will be set by that quantity of material which shows the largest error in the negative direction. It is apparent from the interconnection of the relays that once one of the three relays $C'''$, $A'''$ or $F'''$ is energized the energization of the other two relays is prevented.

Therefore, in accordance with the principles of the invention, three condensers are charged with a combination of voltages dependent upon the actual quantities of materials loaded. The voltages appearing across the terminals of the three condensers are then simultaneously applied to three similarly biased amplifiers. That condenser having the largest negative voltage will act to cut off its associated amplifier first causing deactivation of the other circuits. A signal lamp will then be illuminated to show the operator which of the quantities is next to be loaded. The values of the condensers $F_0$, $A_0$ and $C_0$ and their associated charging resistors are chosen so that the charging and discharging times will occur on the linear portions of their charging and discharging curves, respectively. For the purposes of starting, the circuits are arbitrarily arranged to require the loading of the component materials in the order, coke, steel and cast iron.

Figure 5:
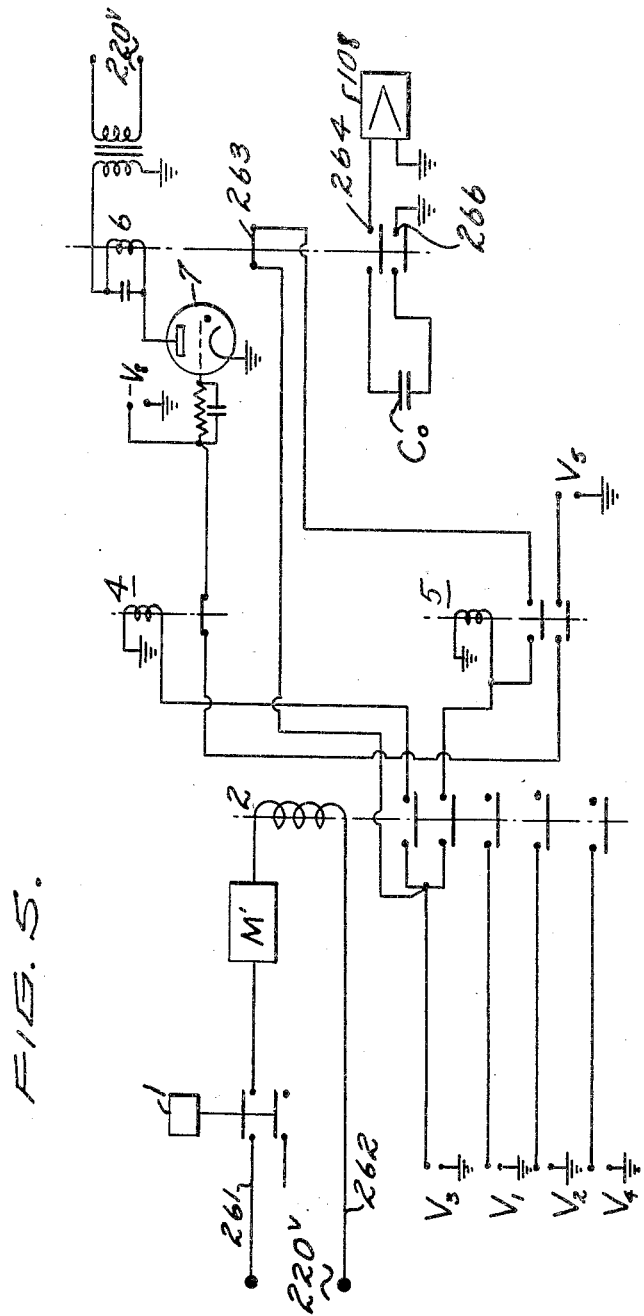
Fig. 5 is an electrical schematic diagram of the apparatus used to start the operation.

Referring now to Figs. 5 and 8 the energization of the relay 6 will be described. It is seen that 220 volts is supplied across the coil of the relay 2 on conductors 261 and 262 through a push button switch 1 and a conventional timer M'. Relay 2 has normally open contacts to which are connected respectively constant voltages from conventional power supplies $V_1$, $V_2$, $V_3$, and $V_4$. The mating contacts of this relay operate to energize relays 4, 5 and 6 as will be described hereinbelow.

The push button switch 1 is associated with the scale upon which the component materials are loaded. Switch 1 opens the hopper discharging the material into the cupola. At this time it is apparent that the index pointer 5 of Figs. 4 and 8 has assumed the position depending upon the actual quantity of the component material loaded. Closing the switch 1 causes the timing switch M' to close thereby energizing relay 2. Referring to Figs. 4 and 5, the closing of the relay 2 operates to supply voltages $V_1$ and $V_2$ to contacts of the relay C and when this relay is closed to the double potentiometer G.

The closing of relay 2 also causes $V_3$ to energize relays 4 and 5. Energization of relay 4 opens its normally closed contact thereby opening the grid circuit of the negatively biased thyratron 7. The relay 6 is in the anode circuit of thyratron 7 and has a normally closed contact 263 as well as normally open contacts 264 and 266.

When the time set by the timing switch M' is completed, the relay 2 opens thereby opening contacts of relay C (Figs. 4 and 8) and ending the charging times of condenser $F_0$, $A_0$ and $C_0$. Similarly, relay 4 (Figs. 5 and 8) is de-energized upon the opening of relay 2. However, the relay 5 remains energized through the normally closed contact 263 of relay 6. This permits the positive voltage $V_5$ to be applied to the grid circuit of the thyratron 7. After a time determined by the time constants of the grid circuit of the thyratron 7, voltage $V_5$ acts to trigger the thyratron. This causes energization of relay 6, opening contacts 263 and closing contacts 264 and 266. The closing of the latter contacts applies the output of the condensers across their respective amplifiers. The opening of contacts 263 causes the deenergization of relay 5 so that when the thyratron discharge is cut off, it will remain in that state until further operation of the push button 1.

Referring now to Fig. 7, the total of the component materials that are loaded in the cupola are indicated in the following manner: The switch 1 has a second set of contacts 271 to which is applied a negative voltage $V_{10}$. When switch 1 is closed, this voltage is applied through the normally closed contact of a relay 270 to a condenser 272 which in turn is connected to a resistor 273 through a movable arm 274. Movable arm 274 is connected to the hopper release and activated by the scale in the same manner as the pointer 5 of Fig. 4.

Also applied through the normally closed contacts of relay 270 is a voltage $V_9$ which energizes a solenoid 276 having a movable magnetic core 277. The core 277 is connected to lever arm 278 and 279 rotatable about a fixed pivot 281. Connected to lever arm 279 is a mechanical register wheel 282 displaying numbers and meshed with a gear for rotation thereof. A second intermediary gear 283 is also connected to lever arm 279. Adjacent the gear 283 is a third gear 284 mounted on the axis of a synchronous motor. The synchronous motor is continuously turning by means of an independent power source.

Accordingly, when a component material is loaded in the hopper the arm 274 moves along resistance 273 and reaches a position proportional to the actual quantity of the material being loaded. When the switch 1 is operated to emit the loaded material, $V_{10}$ charges condenser 272. When switch 1 is open, the condenser discharges through a portion of resistance 273 depending on a position of the arm 274. The discharging condenser will trigger the thyratron 286 thereby energizing relay 270. This opens the normally closed contacts of the relay disconnecting the voltage source $V_9$ from the solenoid coil 276. The core 277 of the solenoid is released dropping the lever arms 278 and 279 and causing the gear 283 to mesh with the gear of the rotating synchronous motor 284. Accordingly, the wheels of the register 282 will be rotated to indicate an amount proportional to the actual quantity of the component material loaded.

Similarly, when each of the other component materials are loaded, the register will rotate an amount proportional to the actual quantity loaded. At the end of the three loading operations the register indicates the total amount loaded.

It will be understood that each of the elements described above, or two or more together, may also find a useful application in other types of automatic computing devices differing from the types described above.

While the invention has been illustrated and described as embodied in maintaining a predetermined ratio between materials being loaded in a cupola, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of making, from a plurality of component materials, a mixture in which said materials are present in a predetermined ratio comprising, in combination, the steps of starting said mixture with the first of said materials at a quantity near the theoretically desired amount; automatically registering the actual quantity of said first material used; adding to the first material an amount of said second material near the theoretically desired amount; automatically registering the actual quantity of said second material added; continuing to add each of said materials at quantities near their theoretical desired values and registering each of the actual quantities used; converting the values of said actual quantities used to electrical voltage values; multiplying each of said voltage values by voltages representing the desired ratios of each of said other materials to obtain a plurality of products; automatically subtracting each of said products from each of said other products to obtain a plurality of product differences, the largest of said product differences being an indication of which of said actual quantities of materials has the largest negative departure from the theoretically desired value; a quantity of said material having the largest negative departure said last mentioned quatity being near the theoretically desired amount of said respective material; and continuing to add quantities near the theoretically desired amounts of said material showing the largest negative departure between actual and theoretical quantities to maintain said predetermined ratio between all of the plurality of component materials in the mixture.

2. An apparatus for controlling the composition of a mixture made up from a plurality of component materials in a predetermined ratio comprising, in combination, means for obtaining a first voltage proportional to the actual quantity of component material added to the mixture; means for obtaining a second voltage proportional to the product of the predetermined ratios of all the other component materials in the mixture; means for multiplying said first and said second voltages to obtain a voltage product; means for similarly obtaining